Figure 1:
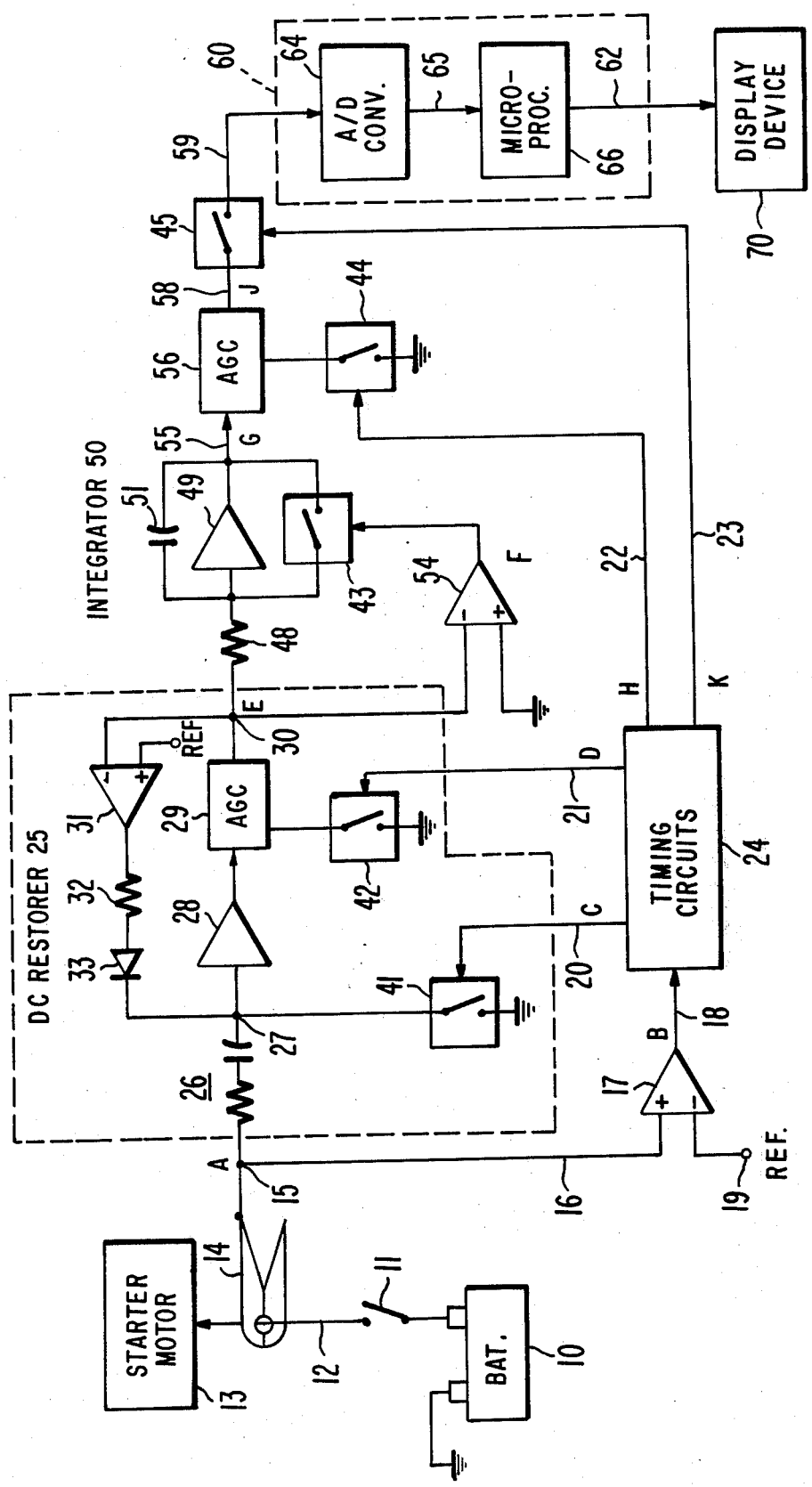

United States Patent [19]

Sutphin, Jr.

[11] 4,062,232
[45] Dec. 13, 1977

[54] TESTING COMPRESSION IN ENGINES FROM STARTER MOTOR CURRENT WAVEFORM

[75] Inventor: Eldon Marvin Sutphin, Jr., Merrimack, N.H.

[73] Assignee: RCA Corporation, New York, N.Y.

[21] Appl. No.: 731,209

[22] Filed: Oct. 12, 1976

[51] Int. Cl.² .......................................... G01M 15/00
[52] U.S. Cl. .................................................. 73/117.2
[58] Field of Search ....................... 73/116, 117.2, 115

[56] References Cited

U.S. PATENT DOCUMENTS

| | | | |
|---|---|---|---|
| 3,765,233 | 10/1973 | Germann | 73/117.2 |
| 3,952,586 | 4/1976 | Hanson et al. | 73/116 X |

Primary Examiner—Jerry W. Myracle
Attorney, Agent, or Firm—H. Christoffersen; Samuel Cohen; Carl V. Olson

[57] ABSTRACT

The relative compression in the cylinders of an internal combustion engine is tested by analyzing the starter motor current waveform when the engine is cranked with the ignition or the fuel inhibited. In asymmetrical engines, where the compression strokes of individual cylinders are unequally spaced in time, the starter current waveform may contain double-hump cycles. The area under each double-hump cycle is integrated, and the integration peaks are compared. The compression in one or more cylinders is deficient if the minimum integration peak is less than the maximum integration peak by a significant percentage such as 15 per cent or more.

4 Claims, 2 Drawing Figures

Fig. I.

TESTING COMPRESSION IN ENGINES FROM STARTER MOTOR CURRENT WAVEFORM

The invention herein described was made in the course of or under a contract or subcontract thereunder with the Department of the Army.

It is known that the compression of an internal combustion engine can be tested by measuring the current drawn by the electric starter motor while cranking the engine with ignition inhibited in the case of ignition engines, and with fuel cut off in the case of diesel engines. See U.S. Pat. No. 3,839,906, issued to R. E. Hanson on Oct. 8, 1974, on an "Apparatus for Engine Compression Testing", and U.S. Pat. No. 3,765,233 issued to R. Germann on Oct. 16, 1973, on a "Device for Measuring Compression of Piston Engines." The starter motor current fluctuates, with maximum values corresponding in time with compression strokes in the engine. The above first-mentioned patented apparatus (1) compares current peaks to determine whether some cylinders have significantly less compression than other cylinders, and, if the cylinders are substantially equal in compression, (2) measures the highest current peak relative to the current average to determine whether all cylinders have less than a satisfactory level of compression. If the first test is failed, repairs to parts of, or associated with, one or more individual cylinders are needed. If the second test is failed, repairs to all cylinders or parts shared by all cylinders are required.

In the case of symmetrical engines, the compression strokes of individual cylinders are evenly spaced in time, and the starter current waveform contains corresponding current peaks which are evenly spaced in time. Each current peak represents the amount of compression in a respective cylinder in the engine. However, in the case of asymmetrical engines, the compression strokes are not evenly spaced in time, and the amplitude of the current peak due to compression in one cylinder may be affected by the compression stroke of another cylinder occurring in overlapping time relationship. Therefore the amplitudes of individual current peaks cannot be used to determine the amount of compression in the corresponding individual cylinders.

In a system embodying the invention, the compression in cylinders of an internal combustion engine is tested by analyzing the starter motor current waveform when the engine is cranked with the ignition or fuel turned off. The areas under selected cycles of the current waveform are integrated, and the integrated values are compared with each other to detect the existence of cylinders having insufficient compression.

Figure 2:
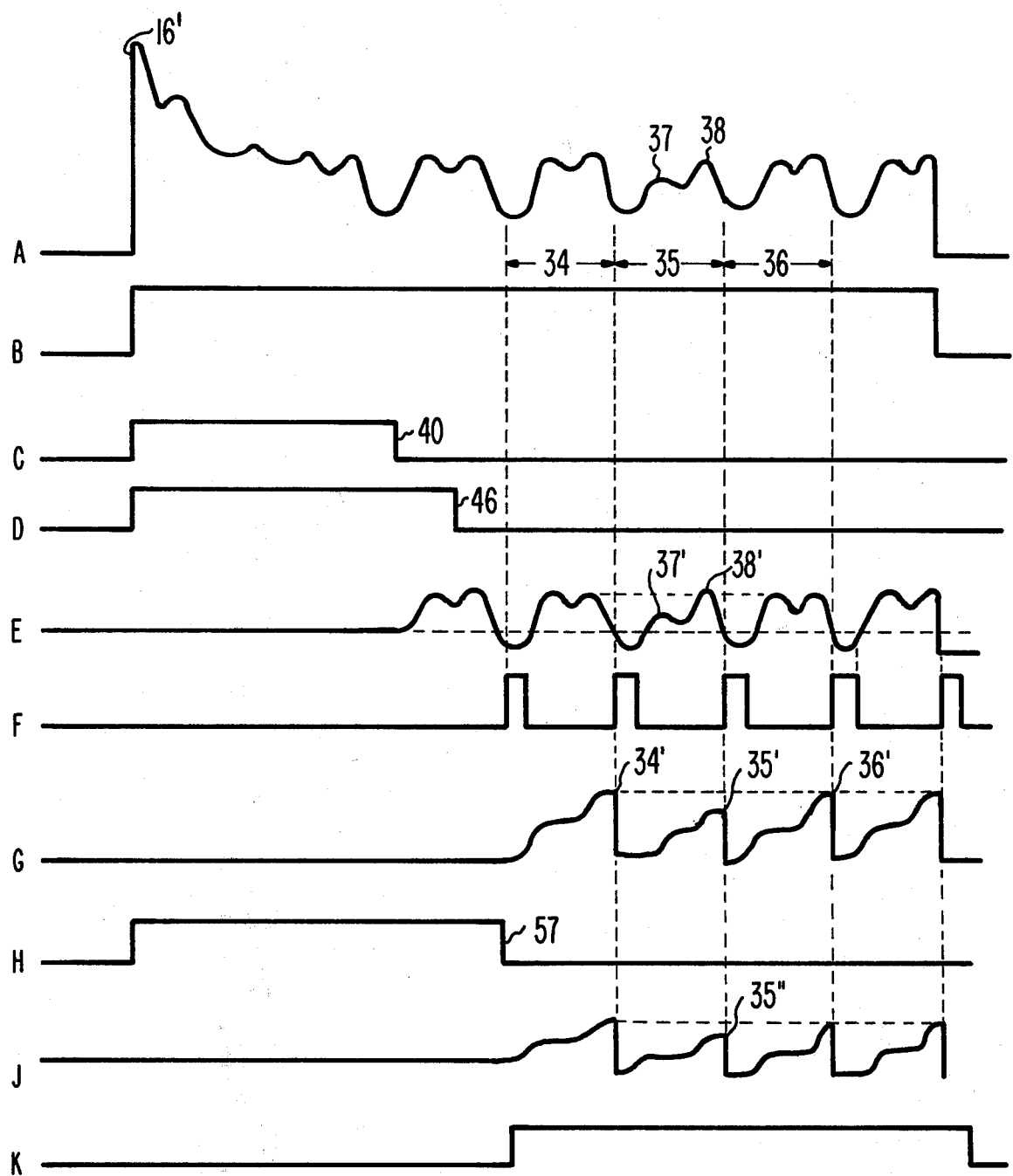

In the drawing:

FIG. 1 is a block diagram of an apparatus constructed according to the teachings of the invention to test relative compression in individual cylinders in an internal combustion engine; and FIG. 2 is a chart of electrical waveforms which will be referred to in describing the operation of the apparatus of FIG. 1.

In FIG. 1, an automobile battery 10 is connected through a starter switch 11 and a wire 12 to a starter motor 13. A clip-on current probe 14 provides a starter current waveform A of FIG. 2 at point 15 which has an initial high peak 16 occurring when starter switch 11 is closed. Thereafter the waveform settles down to a faithful representation of the fluctuating load on the starter motor due to compression strokes in individual cylinders of the engine as the engine is cranked with the ignition or fuel turned off.

The engine is an asymmetrical engine in which the compression strokes are unequally spaced in time. Pairs of cylinders having partially overlapping compression strokes produce double-hump cycles 34, 35 and 36. Cycles 34 and 36 have individual humps of equal amplitudes representing cylinders of equal compression. Cycle 35 is illustrated as having one hump 37 of lesser amplitude than a hump 38. Hump 37 represents a cylinder having an unsatisfactory compression. However, the relative compressions of the cylinders cannot satisfactorily be determined from the corresponding humps in waveform A because the amplitudes of the individual humps are affected by the humps caused by cylinders having time-overlapping compression strokes.

The waveform A is applied over line 16 to the input of an operational amplifier 17, operated as a threshold detector which provides an output waveform B of FIG. 2 at 18 whenever the signal A exceeds the value of a reference voltage from source terminal 19. This occurs during the period that starter switch 11 is closed. The leading edge of waveform B initiates switch-controlling waveforms C, D, H and K on lines 20, 21, 22, and 23, respectively, from conventional timing circuits 24.

The waveform A at point 15 is applied to a D-C restorer 25 including a coupling resistor and capacitor 26, to a point 27 and on through an operational amplifier 28 and an AGC amplifier 29, which may be an RCA Type 68880 integrated circuit unit, to a point 30. A feedback path from point 30 to point 27 includes an operational amplifier 31, a resistor 32 and a diode 33. The amplifier 31 has a reference voltage input to which a 1-volt source is applied so that the circuit acts as a direct-current restorer maintaining the negative peaks of waveform E (FIG. 2) at point 30 at 1 volt below zero or ground potential.

The point 27 is connected through normally-open switch 41 to ground. The switch is closed by action of waveform C (FIG. 2) (when wave C goes relatively positive) over line 20 from timing circuits 24 from the time of the initial starter current peak 16' in the waveform A until a time 40 when the waveform A has recovered from the initial transient.

A normally-open switch 42 is connected between ground and one side of the capacitor (not shown) in the AGC amplifier 29 across which the AGC voltage is developed therein. (The switch is closed in response to the positive-going portion of wave D and open at other times.) Therefore, the AGC amplifier 29 normally functions to limit the amplitude of the output at point 30 to a desired level, but operates as a full-gain amplifier when switch 42 is closed by action of waveform D (FIG. 2) from the time of current peak 16 until the time 46. As a result of the operation of switches 41 and 42, the waveform E at point 30 is about zero until time 40, after which the amplifier 29 fully amplifies the waveform A until time 46, at which time the amplifier 29 operates as a gain-controlled amplifier.

The waveform E at point 30 is applied to an integrator 50 including a resistor 48, an operational amplifier 49, and a feedback integration capacitor 51. The capacitor 51 is shunted by a normally-open switch 43 which is closed by the positive-going pulses of a pulse wave F in FIG. 2 derived by an overdriven amplifier 54 from the negative peaks of waveform E. Each of the pulses of wave F cause a discharging of the charge on integration capacitor 51, followed by the next cycle of integrating the area under the waveform E. The output of integrator 50 at point 55 is then as shown by waveform G of FIG. 2.

Waveform G is seen to include integration peaks 34', 35' and 36' representing the integrated areas of the double hump cycles 34, 35 and 36, respectively. The integration peak 35' is seen to be less than peaks 34' and 36' because the peak 35' is the integral of a small compression hump 37' and a normal compression hump 38'. The amplitude of the compression peak 35' is unaffected by the amount of time overlap between the compression strokes corresponding with the humps 37' and 38'.

The waveform G at point 55 is applied to an AGC amplifier 56 which is rendered inoperative by the closing of a normally-open switch 44 by the positive-going portion of wave form H until the trailing edge 57 of waveform H occurs. Thereafter, the amplifier 56 produced a gain-controlled output waveform at 58, which is as shown by waveform J of FIG. 2. The purpose of the gain-controlled amplifier 56 is to insure an integration waveform J at 58 which has a normalized amplitude despite wide variations in the starter motor input signal amplitudes provided by different internal combustion engines.

The normalized waveform J at 58 is applied through a normally-open switch 45, when the switch is closed by the positive-going portion of timing waveform K, to a comparator 60. The comparator produces a "test-failed" output at 62 if the lowest integration peak of waveform J is a significant proportion less than the highest integration peak of waveform J. It is known that at least one cylinder has unsatisfactory compression if the one integration peak 35" in waveform J is, say, 15 percent or more less than the highest integration peak. Stated another way, compression is unsatisfactory if the ratio between the smallest and largest integration peaks is 0.85 or less.

It will be understood that all of switches 41, 42, 43, 44, and 45 may, in practice, be electronic switches such as transistors, and that they are closed in response to the positive-going part of the control wave applied thereto.

The comparator 60 may be constituted by an analog-to-digital converter 64 which continuously samples the amplitude of the analog signal J and converts the analog samples to digital signals on output line 65. The digital signals are applied to a microprocessor 66 which is programmed to compare the digital value corresponding with the lowest peak in waveform J with the digital value corresponding with the highest peak in waveform J, and to produce an output at 62 to display device 70 indicating whether the difference is greater than a predetermined percentage, such as 15 percent. If the difference is greater than the predetermined percentage, it is known that the compression in one or more cylinders of the engine is deficient and that the appropriate corrective action should be taken.

While the described apparatus is especially useful in detecting unsatisfactory compression in individual cylinders of an asymmetrical internal combustion engine having compression strokes which are unequally spaced in time, it will be understood by those skilled in the art that the apparatus is versatile in that it is equally useful for testing symmetrical engines having compression strokes which are equally spaced in time. When so used, each integration cycle corresponds with the compression stroke of a single cylinder. It will also be understood by those skilled in the art that the apparatus shown in FIG. 1 and described herein is merely illustrative of one of a number of apparatus configurations capable of performing according to the teachings of the invention.

What is claimed is:

1. Apparatus to detect unsatisfactory compression in individual cylinders of an internal combustion engine having compression strokes, comprising
    means for detecting the starter motor current waveform when the engine is cranked with the ignition or fuel inhibited, said waveform having cycles each corresponding with at least one compression stroke,
    means for integrating the area under each of said cycles to produce corresponding integration signals, and
    means for comparing the amplitudes of the smallest and largest integration signals and indicating when their ratio is less than a predetermined value, whereby to register unsatisfactory compression in at least one of the cylinders of the engine.

2. Apparatus defined in claim 1 wherein said engine is asymmetrical, and said cycles each correspond with a group of at least two compression strokes.

3. A method to detect unsatisfactory compression in individual cylinders of an internal combustion engine having compression strokes, comprising the steps of
    detecting the starter motor current waveform when the engine is cranked with the ignition or fuel inhibited, said waveform having cycles each corresponding with at least one compression stroke,
    integrating the area under each of said cycles to produce corresponding integration signals, and
    comparing the amplitudes of the smallest and the largest integration signals and indicating when their ratio is less than a predetermined value, whereby to register unsatisfactory compression in at least one of the cylinders of the engine.

4. A method as defined in claim 3 wherein said engine is asymmetrical and said cycles each correspond with a group of at least two compression strokes.

* * * * *